United States Patent [19]

Leonard

[11] Patent Number: 5,016,357

[45] Date of Patent: May 21, 1991

[54] ARTWORK ANALYSIS DEVICE

[76] Inventor: Paulina K. Leonard, 6642 Main St., Kansas City, Mo. 64113

[21] Appl. No.: 530,897

[22] Filed: May 30, 1990

Related U.S. Application Data

[63] Continuation-in-part of Ser. No. 95,131, Sep. 11, 1987, abandoned.

[51] Int. Cl.[5] .......... G01C 3/00

[52] U.S. Cl. .......... 33/277; 33/1 B; 33/1 K

[58] Field of Search .......... 33/276, 277, 1 B, 1 K, 33/1 C, 1 N, 1 SD, 26, 403; 434/90, 91

[56] References Cited

U.S. PATENT DOCUMENTS

| | | |
|---|---|---|
| 574,605 | 1/1897 | Hailes . |
| 1,415,833 | 5/1922 | Ginsburg . |
| 1,583,965 | 5/1926 | Dunn . |
| 2,193,518 | 3/1940 | Lubin . |

FOREIGN PATENT DOCUMENTS

| | | |
|---|---|---|
| 15752 | 3/1912 | Denmark . |
| 542537 | 1/1942 | United Kingdom . |

*Primary Examiner*—Harry N. Haroian
*Attorney, Agent, or Firm*—Litman, McMahon & Brown

[57] ABSTRACT

A convenient and economical artwork analysis device that visually aids an observer in determining the existence of geometric interrelationships among the artistic elements making up a work of art. The device includes a transparent sheet of synthetic resin material, a plurality of opaque indicia impressed on the sheet presenting a plurality of geometric patterns with small indication circles surrounding and drawing attention to key points of intersection of the indicia. A handle is integral with the sheet for positioning the sheet in order to visually superimpose the indicia on the work of art to aid the observer in determining the existence of and analyzing geometric interrelationships among the artwork elements. In use, the observer holds the device to observe the work of art therethrough and to visually superimpose the indicia thereon.

1 Claim, 2 Drawing Sheets

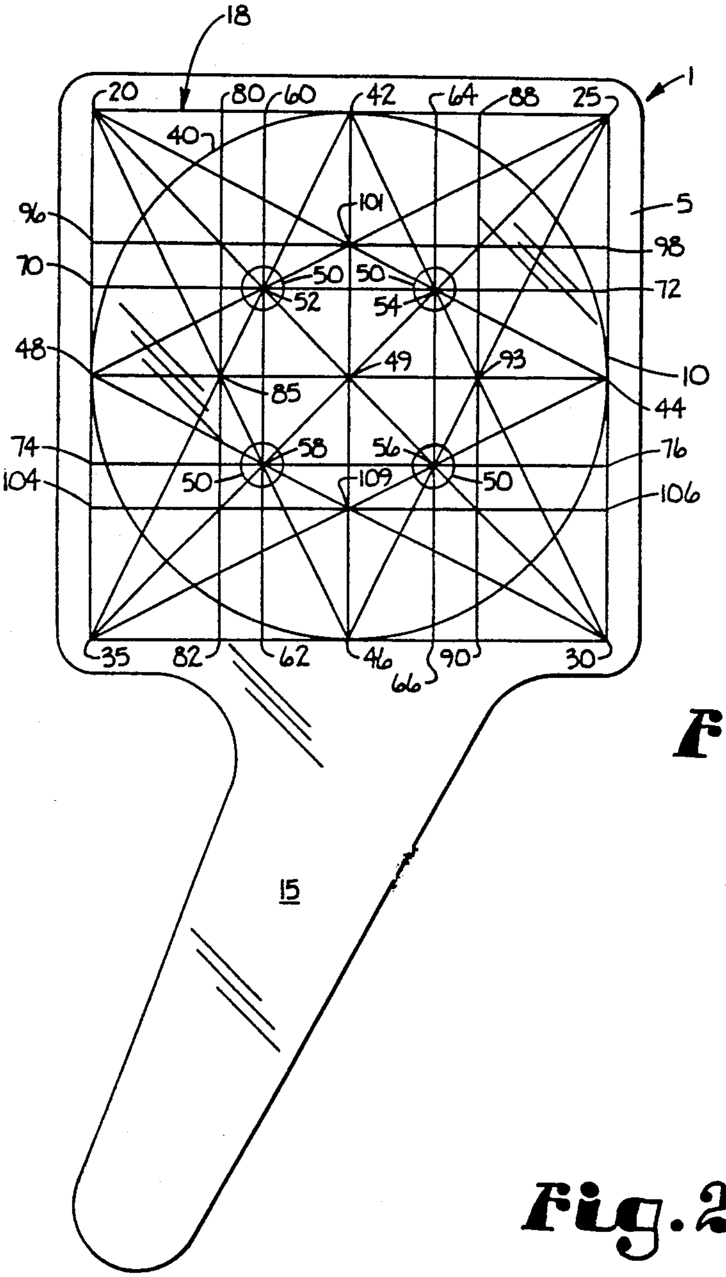
Fig.1.
Fig.2.
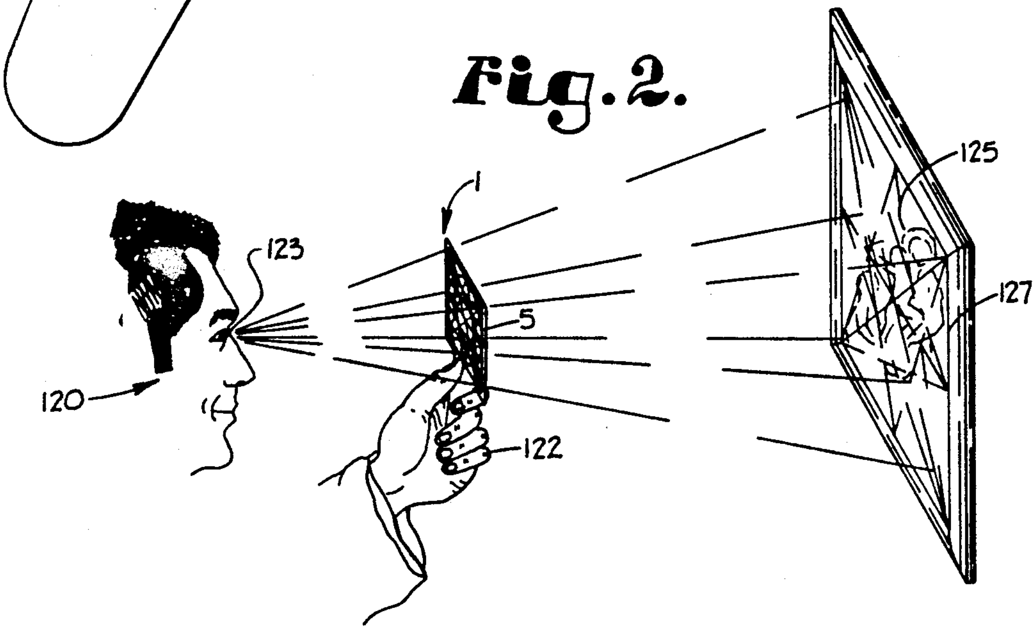

ARTWORK ANALYSIS DEVICE

CROSS-REFERENCE TO RELATED APPLICATION

The present application is a continuation-in-part of U.S. application Ser. No. 07/095,131, entitled ARTWORK ANALYSIS DEVICE, now abandoned.

Background of the Invention

The present invention relates to a device for visually superimposing a plurality of indicia on a work of art in order to aid an observer in determining the existence of geometric interrelationships among the artistic elements making up a work of art. More particularly, the present invention relates to a hand-held device having a transparent sheet imprinted with the following specific arrangement of indicia: a circle, a square circumscribing the circle, a plurality of selected horizontal, vertical and diagonal lines located within the square, creating a variety of geometric shapes, the diagonal lines cooporating with the sides of the square to form four isosceles triangles. Four smaller, indicator circles surround and draw attention to intersections of the isosceles triangles that are also the intersection of three diagonal lines. The hand-held device is placed between an observer and artwork to be analyzed for viewing a work of art therethrough and for visually superimposing the geometric shapes formed by the imprinted indicia onto the work of art.

A person with an untrained eye who views a painting or other work of art, may only see the subject of the work of art. A person with an educated eye, on the other hand, views the work of art with an appreciation of the geometric relationships found within. As briefly described in the following paragraphs, the history of a geometric and numerical structure existing in art and architecture is both long and diverse, and spans a time period of thousands of years. Therefore, a device that aids in educating the eye, by revealing the presence of geometric proportions, balance and harmony in a work of art is an invaluable tool for teaching art appreciation and history.

The conscious use of geometric relationships in works of art appears to have originated with ancient Egyptians who generated a system of practical geometry based on the right triangle from which they developed a style of architecture for tomb and temple building, bas-relief sculpture, pictorial composition and decoration. The Egyptian method of modulation passed into the hands of the Greeks where it evolved into a highly perfected geometry, culminating in the vases, sculpture, and architecture of the Classical period. Following the brief period of Greek Classical Art, the geometrical scheme of design fell into conceptual misuse. But, with the birth of the Renaissance, artists and architects actively sought to rediscover the secrets of the classical proportions of Classical Greece. Leonardo da Vinci, Albrecht Durer, Luca Pacioli, Leon Battista Alberti, Piero della Francesca are among the Renaissance masters who sought a formula for perfected proportion based on geometry, i.e. dynamic symmetry.

Although there has since been a rejection of the ideas of perfected proportions, dynamic symmetry was and is used still (although at times unconsciously), even in our own era of artistic endeavor. Geometric balance, harmony and proportion can be discovered in all great works of art and many twentieth-century artists, such as Seurat, Mondrian, Cezanne, Maillot, and Rodin, consciously and intentionally planned their compositions along lines of geometric proportions.

In order to determine the existence of both planned (and unconsciously created) geometric interrelationships in works of art, students have often taken copies of a work of art and superimposed lines thereon as an aid in determining the hidden compositional arrangement. This technique, however, is both time-consuming and beyond practicality for a teacher and students while visiting an art gallery. Accordingly, there is a need for a device which conveniently allows indicia arranged in geometric patterns to be visually superimposed on a work of art as an aid in determining the existence of geometric interrelationships among the elements of the work of art that has not been fully satisfied by the prior art.

The artwork analysis device in accordance with the present invention is distinguished from optical instruments created to assist beginning artists in reproducing an object or a perspective drawing in its true proportions. Such instruments have included, for example, a transparent sheet imprinted with a series of concentric circles or a grid work of horizontal, vertical and diagonal lines. Such instruments solve the problem of a budding artist's inability to properly proportion a drawing or accurately determine the vanishing point when drawing from nature or copying a perspective drawing. Such instruments do not disclose the specific arrangement of indicia lines of the artwork analysis device of the present invention that provides an educational tool for creating an awareness of the significant geometric relationships in existing works of art.

SUMMARY OF THE INVENTION

The artwork analysis device according to the present invention includes a sheet of transparent synthetic resin material, a plurality of contrasting indicia imprinted on the sheet and configured to present a plurality of geometric patterns, and a handle integrally coupled with the sheet for positioning the sheet between an observer and a work of art for viewing of the work of art therethrough, and for visually superimposing the indicia on the work of art in order to aid the observer in determining the existence of geometric interrelationships among the artistic elements making up the work of art. The contrasting indicia imprinted on the sheet includes: a circle, an outer square circumscribing the circle, a plurality of selected vertical, horizontal and diagonal lines located within the square creating a variety of geometric shapes, the diagonal lines cooperating with the sides of the square to form four isosceles triangles. Four small indicator circles surround and draw attention to intersections of a vertical, a horizontal and three diagonal lines, that are also intersection points of the four isosceles triangles. Designating these four intersection points by surrounding them with indicator circles also assists a user of the artwork analysis device in viewing symmetry not always apparent in a painting or other work of art.

In use, the observer preferably holds the device to observe the work of art therethrough and to visually superimpose the indicia thereon. By varying the distance between the observer and the device, and thereby varying the distance between the device and the work of art, the observer can vary the apparent visual size of the indicia relative to the work of art in order to cause the outer square imprinted on the device to align with the outline of the work of art, for example, or to align other certain indicia on the device with certain other elements of the work of art as desired.

OBJECTS OF THE INVENTION

Therefore, the objects of the present invention are: to provide a device to aid in artwork analysis particularly well adapted for determining the existence of geometric interrelationships among the artistic elements making up a work of art; to provide such a device that is placed between an observer and artwork to be analyzed for viewing a work of art therethrough; to provide such a device having indicia selected imprinted thereupon for visually superimposing geometric shapes formed by the imprinted indicia onto a work of art viewed therethrough; to provide such a device that may be handheld; and, to provide such a device that is relatively easy to use, inexpensive to construct and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a top plan view of an artwork analysis device according to the present invention.

FIG. 2 is a reduced perspective view of the artwork analysis device including an observer shown holding the device and viewing a work of art therethrough.

DETAILED DESCRIPTION OF THE INVENTION

Figure 3:
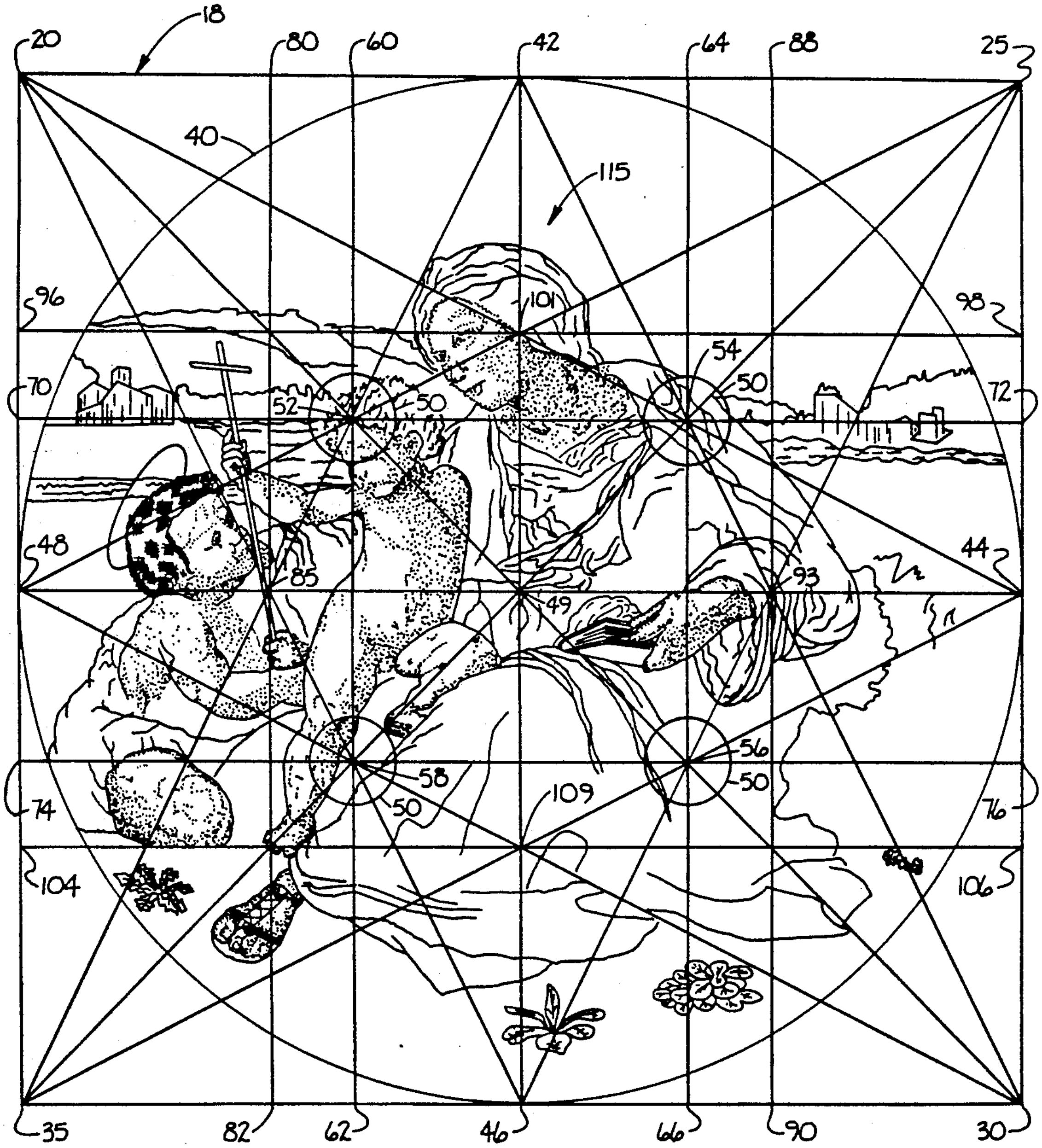
FIG. 3 is an enlarged and fragmentary top plan view of the artwork analysis device superimposed on a work of art.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

FIG. 1 illustrates a top plan view of the artwork analysis device according to the present invention, generally designated by the reference numeral 1, including a transparent sheet 5, indicia generally represented by the reference numeral 10, and positioning means illustrated by handle 15.

Preferably, sheet 5 and handle 15 are integrally formed of a unitary, flat, relatively thin sheet of transparent synthetic resin material. The combination of sheet 5 and handle 15 is sufficiently rigid so that when a user is holding handle 15 in an upright position, sheet 5 is likewise supported in an upright position. The present invention is however not limited by the use of handle 15, but contemplates any means by which sheet 5 can be positioned to visually superimpose indicia 10 on a work of art.

Indicia 10 are preferably a plurality of thin, black, opaque lines imprinted or impressed on sheet 5 by conventional lithographic processes. However, all that is required is that indicia 10 be in visual contrast to sheet 5. For example, sheet 5 could be equivalently composed of a relatively transparent synthetic resin material tinted a certain color, and indicia 10 could be likewise transparent but tinted in a contrasting color. Furthermore, indicia 10 need not be composed of thin lines but could present fairly wide bands or blocks presenting geometric patterns.

The individual indicia impressed on sheet 12 are further identified on FIGS. 1 and 3. An outer square, generally designated by the reference numeral 18 is formed by lines connecting point 20 to point 25, point 25 to point 30, point 30 to point 35 and point 35 to point 20. The square 18 circumscribes a circle 40. The points where square 18 is tangent to circle 40 are designated by the reference numerals 42, 44, 46 and 48, with point 42 being the midpoint of line 20–25, point 44 being the midpoint of line 25–30, point 46 being the midpoint of line 30–35 and point 48 being the midpoint of line 35–20. The indicia 10 includes vertical line 42–46 and horizontal line 44–48, intersecting at midpoint 49. Lines 42–46 and 44–48 in cooperation with square 18 a portion the transparent sheet 5 into four squares of equal size, assisting a user of device 1 in perceiving symmetry and balance in a work of art. The four squares may be defined by connecting the following points: 20–42–49–48, 42–25–44–49, 49–44–30–46 and 48–49–46–35.

The indicia 10 also include diagonal lines connecting the following points: 20–30, 20–44, 20–46, 25–35, 25–46, 25–48, 30–42, 30–48, 35–42 and 35–44. Diagonal lines 20–30 and 25–35 each aportion square 18 into two right triangles of equal size. The two right triangles formed by diagonal line 20–30 may be defined by connecting the following points: 20–25–30 and 20–35–30. The two right triangles formed by diagonal line 25–35 may be defined by connecting the following points: 25–30–35 and 25–20–35. Diagonals 20–30 and 25–35 intersect at midpoint 49.

Indicator means as illustrated by small indicator circles 50 encircle or surround and draw attention to points 52, 54, 56 and 58, the locations where three diagonal lines intersect. Lines 20–30, 25–48 and 35–42 intersect at point 52. Lines 20–44, 25–35 and 30–42 intersect at point 54. Lines 20–30, 25–46 and 35–44 intersect at point 56. Lines 20–46, 25–35 and 30–48 intersect at point 58.

Points 60 and 62 indicate the ends of a vertical line 60–62 that passes through points 52 and 58. Points 64 and 66 indicate the ends of a vertical line 64–66 that passes through points 54 and 56. Lines 60–62 and 64–66 apportion square 18 into thirds or three rectangles of equal area designated by the following coordinates: 20–60–62–35, 60–64–14 66–62 and 64–25–30–66.

Points 70 and 72 indicate the ends of a horizontal line 70–72 that passes through points 52 and 54. Points 74 and 76 indicate the ends of a horizontal line 74–76 that passes through points 56 and 58. Lines 70–72 and 74–76 apportion square 18 into thirds or three rectangles of equal area designated by the following coordinates: 20–25–72–70, 70–72–76–74 and 74–76–30–35. Lines 60–62, 64–66, 70–72 and 74–76 also intersect with diagonal lines at key intersection points 52, 54, 56 and 58 surrounded by indicator circles 50.

Points 80 and 82 indicate the ends of a vertical line 80–82 that passes through a point 85. Point 85 is the intersection of diagonal lines 20–46 and 35–42. Points 88 and 90 indicate the ends of a vertical line 88–90 that passes through a point 93. Point 93 is the intersection of diagonal lines 25–46 and 30–42. Lines 80–82, 42–46, and 88–90 apportion square 18 into fourths or four rectangles of equal area designated by the following coordinates: 20–80–82–35, 80–42–46–82, 42–88–90–46 and 88–25–30–90.

Points 96 and 98 indicate the ends of a horizontal line 96–98 that passes through a point 101. Point 101 is the intersection of diagonal lines 20–44 and 25–48. Points 104 and 106 indicate the ends of a horizontal line 104–106 that passes through a point 109. Point 109 is the intersection of diagonal lines 30–48 and 35–44. Lines 96–98, 48–44 and 104–106 apportion square 18 into fourths or four rectangles of equal area designated by the following coordinates: 20–25–98–96, 96–98–44–48, 48–44–106–104 and 104–106–30–35.

Many more proportional and geometrical relationships are indicated by the indicia 10. For example, four isosceles triangles are created by the sides of the outer square 18 in coordination with certain diagonal lines. The four triangles are represented by the following end points or coordinates: 20–25–46, 25–30–48, 30–35–42 and 35–20–44. Points 52, 54, 56 and 58 are key because they indicate points of intersection of the four isosceles triangles described in the previous sentence. Midpoints of square 18, represented by the points 42, 44, 46 and 48 also represent the apexes of the isosceles triangles.

Reference circles 50 surrounding the critical or key points 52, 54, 56 and 58 are particularly helpful to a user of device 1 because points 52, 54, 56 and 58 are the starting point for discovering the presence of geometrical relationships. In addition to being points of intersection of the isosceles triangles described in the previous paragraph, points 52, 54, 56 and 58 are equadistant from the center point 49 with points 52 and 56 located on diagonal line 20–30 and points 54 and 58 located on diagonal line 25–35. Therefore, points 52, 54, 56 and 58 are the only locations of intersection of diagonal lines on device 1. The four key points 52, 54, 56 and 58 may be used to aid in discovering critical symmetrical relationships and equidistances between elements within a given composition. Because points 52, 54, 56 and 58 are located on vertical lines 60–62 and 64–66 and horizontal lines 70–72 and 74–76 the points also help a user of device 1 to recognize symmetrical proportions not always obvious to the untrained eye when viewing a work of art and help to reveal areas of balance and counterbalance in a painting or other work of art and architecture. Furthermore, when viewing numerous works of art, it has been found that one of the key points 52, 54, 56 or 58 is often a starting point in a composition for a path for an observer's eyes to follow, the path being determined by an artist's arrangement of pictorial elements in the work of art. Also, very often in various works of art, a right triangular pattern emerges, with the points of the right triangle corresponding with three of the four key points 52, 54, 56 or 58.

Numerous other triangular, rectangular and other polygonal shapes are represented by the indicia 10 for aiding in the discovery of geometrical relationships in works of art. For example, FIG. 3 illustrates an image which an observer might see when using the device 1 to superimpose indicia 10 on a painting 115. The work of art illustrated is a drafter's rendition of the painting "The Alba Madonna", by Raphael (1483–1529), which is otherwise known as the "Round Madonna" because the painting is round rather than rectangular. The circular indicium 40 is visually aligned with the periphery of the painting. The three figures depicted represent the Madonna holding the Christ child with the infant St. John looking on.

With the visual superposition of indicia 10 on painting 115, a number of symmetrical relationships are immediately apparent. First, the Madonna is centered along vertical line 42–46. The upper body portion of the Madonna above horizontal line 44–48 is similarly balanced by the lower body portion below line 44–48. Furthermore, the center of mass between the two child figures at point 85 is similarly balanced by the left arm of the Madonna at point 93. Additionally, the portion of the background above line 96–98 is similarly balanced by that portion below line 104–106. By the use of indicia 10 as superimposed on painting 115, observers can readily find numerous other symmetries which contribute to the overall balance of painting 115.

The use of device 1 in connection with painting 115 also illustrates numerous other geometric interrelationships existing between the artistic elements making up painting 115. For example, one of the most striking of these interrelationships is that the line of sight of all three figures runs parallel to line 25–48. Additionally, line 25–35 passes through the right foot of the Christ child and is parallel to the left foreleg and left forearm of Madonna. Line 30–42 is generally parallel to the left upper arm of the Madonna. Furthermore, a strong compositional element of the leg of the Madonna rests within the triangle formed by lines 25–35, 35–44, and 20–30 and it can be observed that the book held in the lap of the Madonna stops at line 20–30.

The long member of the cross held by the Christ child apparently does not visually align with any of the indicia superimposed on painting 115. However, this long member perfectly aligns with an indicium included as a set based on a twelve-pointed star (not shown). Therefore, it is forseen that certain other geometric patterns may be added to the device 1.

Many other geometric interrelationships exist among the elements of painting 115 and doubtless do exist given the Renaissance philosophy of consciously composing works of art to incorporate many such relationships. As illustrated by the description herein, indicia 10 visually cooperate with the artistic elements of painting 115 and thereby aid in determining and analyzing interrelationsips and provide a ready means for conveniently pointing out these interrelationships to others.

In operation, the device 1 of the present invention is utilized as illustrated in FIG. 2. An observer 120 holds the handle 15 of the device 1 in his or her hand 122 and visually positions sheet 5 between the observer's eyes 123 and a work of art or painting 125 so that certain of the indicia 10 are aligned with certain reference points. For example, the outer square 18 or circle 40 may be aligned with the perifery 127 of the painting 125. The observer 120 by adjusting the position of the device 1 relative to the painting 125 can vary the apparent size of the indicia 10 relative thereto in order to align certain of indicia 10 with different selected reference points of the painting 125. Additionally, observer 120 can advantageously move device 1 vertically or horizontally or rotate device 1 to further align certain of indicia 10 with other selected reference points. In this way, different positions of indicia 10 may aid the observer in perceiving additional interrelationships within the painting 125.

The device 1 may also be utilized by placing the device 1 directly on a copy of a work of art (not shown) that has been reduced such that the perifery of the work of art aligns with the outer square 18 or other indicia 10 of the device 1. Such a utilization is particularly well suited for classroom use. It is forseen that the device 1 may also be enlarged or reduced depending on the particular utilization thereof.

It is to be understood that while certain forms of the present invention have been illustrated and described herein, it is not to be limited to the specific forms or arrangement of parts described and shown.

What is claimed and desired to be secured by Letters Patent is as follows:

1. An artwork analysis device for visually aiding an observer in perceptually determining the existence of and analyzing geometric interrelationships among the artistic elements making up a work of art, said device comprising;

(a) a sheet having an indicia receiving portion constructed of transparent material;

(b) a handle extending from said sheet adapted to be held by a user so as to allow a user to view through said indicia receiving portion while said device is being held by the user; and (c) a plurality of contrasting indicia impressed on said indicia receiving portion of the sheet; said indicia being opaque as compared to a remainder of said indicia receiving portion so as to be adapted to allow a user to view a work of art through said indicia receiving portion while comparing a pattern formed by said indicia with the artistic elements of the work of art; said indicia including:

(1) a square fully within said indicia receiving portion of said sheet and having a center point, four sides and two pairs of diagonally opposed corners; each of said sides having a midpoint;

(2) two diagonal lines extending between said opposed corners respectively;

(3) four isosceles triangles each presenting a base and an opposed apex; each base of said triangles being coextensive with a respective one of said sides; and each apex of said triangle coinciding with a respective one of said midpoints opposite the square side associated with the base of the triangle;

(4) first, second, third and fourth indicator circles respectively surrounding and drawing attention to a first, second, third and fourth point of intersection of one of said diagonals and two of said isosceles triangles, said circles being equally spaced from nearest sides of said square and from one another so as to be positioned at four separate corners of a square configuration;

(5) a fifth circle circumscribed by said square and touching each of the sides of said square;

(6) a first vertical line and a first horizontal line each passing through said first point;

(7) a second vertical line passing through said second point; said first horizontal line passing through said second point;

(8) a second horizontal line passing through said third point; said second vertical line passing through said third point;

(9) a third vertical line passing through said center point;

(10) a third horizontal line passing through said center point;

(11) fourth and fifth vertical lines respectively passing through fifth and sixth points; said fifth and sixth points each located at an intersection of said third horizontal line and two of said isosceles triangles; and

(12) fourth and fifth horizontal lines respectively passing through seventh and eighth points; said seventh and eighth points each located at an intersection of said third vertical line and two of said isosceles triangles; and

(13) said first and second vertical lines visually dividing said square into vertically aligned thirds; and first and second horizontal lines visually dividing said square into horizontally aligned thirds; said third, fourth and fifth vertical lines visually dividing said square into vertically aligned fourths; and said third, fourth and fifth horizontal lines visually dividing said square into horizontally aligned fourths.

* * * * *